(12) United States Patent
Yan

(10) Patent No.: US 11,650,993 B2
(45) Date of Patent: May 16, 2023

(54) INFORMATION QUERY METHOD FOR TERMINAL AND TERMINAL

(71) Applicant: HUAWEI TECHNOLOGIES CO., LTD., Shenzhen (CN)

(72) Inventor: Wei Yan, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/053,796

(22) PCT Filed: May 21, 2019

(86) PCT No.: PCT/CN2019/087703
§ 371 (c)(1),
(2) Date: Nov. 9, 2020

(87) PCT Pub. No.: WO2019/223667
PCT Pub. Date: Nov. 28, 2019

(65) Prior Publication Data
US 2021/0209113 A1    Jul. 8, 2021

(30) Foreign Application Priority Data

May 24, 2018   (CN) .......................... 201810511527.9

(51) Int. Cl.
*G06F 16/2455* (2019.01)
*G06F 16/21* (2019.01)
(Continued)

(52) U.S. Cl.
CPC ...... *G06F 16/24564* (2019.01); *G06F 16/217* (2019.01); *G06F 16/248* (2019.01); *G06F 16/2477* (2019.01)

(58) Field of Classification Search
None
See application file for complete search history.

(56) References Cited

U.S. PATENT DOCUMENTS 8,646,060 B1* 2/2014 Ben Ayed ............... H04W 4/20
726/9
10,169,571 B1* 1/2019 Attfield ................... G06F 21/62
(Continued)

FOREIGN PATENT DOCUMENTS

CN      102024010 A     4/2011
CN      104021141 A     9/2014
(Continued)

OTHER PUBLICATIONS

PCT Communication for International Application PCT/CN2019/087703 dated May 21, 2019, 9 pages.
(Continued)

*Primary Examiner* — Dawaune A Conyers

(57) ABSTRACT

Embodiments of this application provide an information query method for a terminal and a terminal, to reduce unnecessary bandwidth traffic of a user and reduce a processing load of a service system when querying service information on a terminal app. The method in the embodiments of this application includes: receiving a first request, where the first request is used to indicate to query target service information of a first application app on the terminal; and determining, according to a query policy preset on the terminal, to process the first request on the terminal or request a service system associated with the terminal to process the first request.

20 Claims, 10 Drawing Sheets

(51) Int. Cl.
  *G06F 16/2458* (2019.01)
  *G06F 16/248* (2019.01)

(56) References Cited

U.S. PATENT DOCUMENTS

| | | | |
|---|---|---|---|
| 2010/0010965 A1 | 1/2010 | Edlund et al. | |
| 2010/0041391 A1* | 2/2010 | Spivey | H04W 12/10 |
| | | | 455/425 |
| 2010/0173612 A1* | 7/2010 | Khanfouci | H04W 16/16 |
| | | | 455/418 |
| 2014/0095594 A1* | 4/2014 | Tsuchiya | G06Q 30/0601 |
| | | | 709/203 |
| 2015/0302185 A1 | 10/2015 | Xu et al. | |
| 2020/0301917 A1* | 9/2020 | Niu | H04L 63/20 |
| 2021/0176637 A1* | 6/2021 | Flynn, IV | H04W 12/08 |

FOREIGN PATENT DOCUMENTS

| | | |
|---|---|---|
| CN | 104978278 A | 10/2015 |
| CN | 106130812 A | 11/2016 |
| CN | 106657367 A | 5/2017 |
| CN | 106658412 A | 5/2017 |

OTHER PUBLICATIONS

Office Action for Chinese Application No. 201810511527 dated Dec. 14, 2022, 7 pages.

* cited by examiner the second preset duration. In this implementation, some query requests may be processed inside the terminal. This can reduce unnecessary bandwidth traffic of a user and a processing load of the service system.

INFORMATION QUERY METHOD FOR TERMINAL AND TERMINAL

This application is a National Stage of International Patent Application No. PCT/CN2019/087703, filed on May 21, 2019, which claims priority to Chinese Patent Application No. 201810511527.9, filed on May 24, 2018, both of which are incorporated herein by references in their entireties.

TECHNICAL FIELD

This application relates to the field of communications technologies, and in particular, to an information query method for a terminal and a terminal.

BACKGROUND

A service system provides query of basic service information for an application (APP) on a terminal. The apps on the terminal include a video app, an application market app, a game center app, a music app, a reading app, and the like. The basic service information includes a virtual currency, user bonus points, a user avatar, and the like. The basic service information of these apps is the same on the same terminal.

In the prior art, to implement the foregoing query, the plurality of client apps such as the video app, the application market app, the game center app, the music app, and the reading app initiate a request to backend application servers, and then each application server initiates a service request to the service system based on the received request.

A traffic control module and a service processing subsystem are provided on the service system. The traffic control module performs traffic control on the requests of the plurality of applications. When the service requests of the plurality of applications exceed a processing capability of the service processing subsystem, the traffic control module discards the requests that exceed the processing capability of the service processing subsystem, and returns a response of system busy to the application server sides. Each application server returns failure information such as system busy to an app corresponding to the application server.

In the prior art, as long as an app on the terminal initiates a request, the service system can receive the request, and a plurality of applications on a same terminal may simultaneously (or at a very short interval) send a same service request to application servers of the plurality of applications, for example, obtain virtual currency information of a user. However, because basic user information of all apps in an operating system of the terminal is the same, basic information corresponding to a same service request is also the same. When the plurality of applications send the same service request, the service system can receive the plurality of service requests of the user. In a wireless access manner such as a fourth generation mobile communications technology (4G), this increases unnecessary bandwidth traffic of the user, and increases a processing load of the service system.

SUMMARY

Various embodiments provide an information query method for a terminal and a terminal, so that unnecessary bandwidth traffic of a user and a processing load of a service system can be reduced when service information on a terminal app is queried.

According to a first aspect of this embodiment, an information query method for a terminal is provided, and the method specifically includes: receiving, by the terminal, a first request, where the first request is used to indicate to query target service information of a first application app on the terminal; and determining, by the terminal according to a query policy preset on the terminal, to process the first request on the terminal or request a service system associated with the terminal to process the first request. The query policy is preset on the terminal in this embodiment. The terminal may filter out some query requests according to the query policy. The filtered query requests may be processed inside the terminal without being sent to a service system side. This can reduce unnecessary bandwidth traffic of a user and a processing load of the service system.

In one example design, in a first implementation of the first aspect of this embodiment, before the receiving a first request, the method further includes: receiving, by the terminal, the target service information based on a second request, where the second request indicates to query the target service information of a second app on the terminal; and storing the target service information and recording a storage moment of the target service information. In this implementation, before the terminal receives the first request, the terminal already stores the target service information obtained from the service system. This improves implementability and integrity of the solution.

In one example design, in a second implementation of the first aspect of this embodiment, the determining, according to a query policy preset on the terminal, to process the first request on the terminal or request a service system associated with the terminal to process the first request includes: when the first request meets a first condition, requesting, by the terminal, the service system to process the first request, where the first condition includes: there is no target service information stored on the terminal and/or a service type of the target service information is a first service type; and when the first request does not meet the first condition, determining, based on storage duration of the target service information on the terminal, to process the first request on the terminal or request the service system to process the first request. In this implementation, when the first request does not meet the first condition, the terminal determines, based on the storage duration of the target service information, to process the first request inside the terminal or send the first request to the service system, so that some query requests can be filtered out. This can reduce unnecessary bandwidth traffic of a user and a processing load of the service system.

In one example design, in a third implementation of the first aspect of this embodiment, the determining, based on storage duration of the target service information on the terminal, to process the first request on the terminal or request the service system to process the first request includes: determining, by the terminal, whether the storage duration is greater than first preset duration and less than second preset duration, where the first preset duration and the second preset duration separately correspond to the target service information of the first app; and if the storage duration of the target service information is greater than the first preset duration and less than the second preset duration, querying the terminal for the target service information. In this implementation, some query requests may be processed inside the terminal. This can reduce unnecessary bandwidth traffic of a user and a processing load of the service system.

In one example design, in a fourth implementation of the first aspect of this embodiment, the determining whether the storage duration is greater than first preset duration and less than second preset duration includes: determining, by the terminal, whether a time interval between the storage moment and a query moment is greater than the first preset duration and less than the second preset duration, where the query moment is a moment at which the first request is received. This implementation provides a specific manner of obtaining the storage duration. This improves operability of the solution.

In one example design, in a fifth implementation of the first aspect of this embodiment, the determining, based on storage duration of the target service information on the terminal, to process the first request on the terminal or request the service system to process the first request includes: determining, by the terminal, whether the storage duration is greater than second preset duration, where the second preset duration corresponds to the target service information of the first app; if the storage duration is greater than the second preset duration, sending the first request to the service system; and receiving the target service information sent by the service system. This implementation provides another manner of processing the first request by the terminal. The first request is sent to the service system, and a query request that cannot be processed inside the terminal is sent to the service system for processing. This improves implementability and integrity of the solution.

In one example design, in a sixth implementation of the first aspect of this embodiment, the determining whether the storage duration is greater than second preset duration includes: determining, by the terminal, whether a time interval between the storage moment and a query moment is greater than the second preset duration, where the query moment is a moment at which the first request is received. This implementation provides a specific manner of obtaining the storage duration. This improves operability of the solution.

In one example design, in a seventh implementation of the first aspect of this embodiment, after the receiving the target service information sent by the service system, the method further includes: storing the target service information and recording the storage moment of the target service information. In this implementation, after receiving the target service information from the service system, the terminal further needs to store the target service information. This improves implementability and integrity of the solution.

In one example design, in an eighth implementation of the first aspect of this embodiment, the determining, based on storage duration of the target service information on the terminal, to process the first request on the terminal or request the service system to process the first request includes: determining, by the terminal, whether the storage duration is less than first preset duration, where the first preset duration corresponds to the target service information of the first app; and if the storage duration is less than the first preset duration, returning, by the terminal, request failure information to the first app. In this implementation, when the storage duration of the target service information on the terminal is less than the first preset duration, request failure information is returned to a corresponding app, to prevent the terminal from frequently sending a same type of query information to the service system, and prevent a malicious program of an app on the terminal from sending a large quantity of query requests to the service system.

In one example design, in a ninth implementation of the first aspect of this embodiment, the determining whether the storage duration is less than first preset duration includes: determining whether a time interval between the storage moment and a query moment is less than the first preset duration, where the query moment is a moment at which the first request is received. This implementation provides a specific manner of obtaining the storage duration. This improves operability of the solution.

In one example design, in a tenth implementation of the first aspect of this embodiment, the query policy further includes a range of apps to which the query policy is applicable on the terminal. The query policy in this implementation further includes the application scope of the query policy. This improves completeness of the solution.

According to a second aspect of this embodiment, a terminal is provided, including: a first receiving unit, configured to receive a first request, where the first request is used to indicate to query target service information of a first application app on the terminal; and a determining unit, configured to determine, according to a query policy preset on the terminal, to process the first request on the terminal or request a service system associated with the terminal to process the first request. The query policy is preset on the terminal in this embodiment. The terminal may filter out some query requests according to the query policy. The filtered query requests may be processed inside the terminal without being sent to a service system side. This can reduce unnecessary bandwidth traffic of a user and a processing load of the service system.

In one example design, in a first implementation of the second aspect of this embodiment, the terminal further includes: a second receiving unit, configured to receive the target service information based on a second request, where the second request indicates to query the target service information of a second app on the terminal; and a storage unit, configured to store the target service information and record a storage moment of the target service information. In this implementation, before the terminal receives the first request, the terminal already stores the target service information obtained from the service system. This improves implementability and integrity of the solution.

In one example design, in a second implementation of the second aspect of this embodiment, the determining unit includes: a first processing subunit, configured to, when the first request meets a first condition, request the service system to process the first request, where the first condition includes: there is no target service information stored on the terminal and/or a service type of the target service information is a first service type; and a second processing subunit, configured to, when the first request does not meet the first condition, determine, based on storage duration of the target service information on the terminal, to process the first request on the terminal or request the service system to process the first request. In this implementation, when the first request does not meet the first condition, the terminal determines, based on the storage duration of the target service information, to process the first request inside the terminal or send the first request to the service system, so that some query requests can be filtered out. This can reduce unnecessary bandwidth traffic of a user and a processing load of the service system.

In one example design, in a third implementation of the second aspect of this embodiment, the second processing subunit includes: a first determining module, configured to determine whether the storage duration is greater than first preset duration and less than second preset duration, where the first preset duration and the second preset duration separately correspond to the target service information of the first app; and a query module, configured to, when the storage duration is greater than the first preset duration and less than the second preset duration, query the terminal for the target service information. In this implementation, some query requests may be processed inside the terminal. This can reduce unnecessary bandwidth traffic of a user and a processing load of the service system.

In one example design, in a fourth implementation of the second aspect of this embodiment, the first determining module is specifically configured to: determine whether a time interval between the storage moment and a query moment is greater than the first preset duration and less than the second preset duration, where the query moment is a moment at which the first request is received. This implementation provides a specific manner of obtaining the storage duration. This improves operability of the solution.

In one example design, in a fifth implementation of the second aspect of this embodiment, the second processing subunit includes: a second determining module, configured to determine whether the storage duration is greater than second preset duration, where the second preset duration corresponds to the target service information of the first app; a sending module, configured to, when the storage duration is greater than the second preset duration, send the first request to the service system; and a receiving module, configured to receive the target service information sent by the service system. This implementation provides another manner of processing the first request by the terminal. The first request is sent to the service system, and a query request that cannot be processed inside the terminal is sent to the service system for processing. This improves implementability and integrity of the solution.

In one example design, in a sixth implementation of the second aspect of this embodiment, the second determining module is specifically configured to: determine whether a time interval between the storage moment and a query moment is greater than the second preset duration, where the query moment is a moment at which the first request is received. This implementation provides a specific manner of obtaining the storage duration. This improves operability of the solution.

In one example design, in a seventh implementation of the second aspect of this embodiment, the second processing subunit further includes: a storage module, configured to store the target service information and record the storage moment of the target service information. In this implementation, after receiving the target service information from the service system, the terminal further needs to store the target service information. This improves implementability and integrity of the solution.

In one example design, in an eighth implementation of the second aspect of this embodiment, the second processing subunit includes: a third determining module, configured to determine whether the storage duration is less than first preset duration, where the first preset duration corresponds to the target service information of the first app; and a returning module, configured to return request failure information to the first app when the storage duration is less than first preset duration. In this implementation, when the storage duration of the target service information on the terminal is less than the first preset duration, request failure information is returned to a corresponding app, to prevent the terminal from frequently sending a same type of query information to the service system, and prevent a malicious program of an app on the terminal from sending a large quantity of query requests to the service system.

In one example design, in a ninth implementation of the second aspect of this embodiment, the third determining module is specifically configured to: determine whether a time interval between the storage moment and a query moment is less than the first preset duration, where the query moment is a moment at which the first request is received. This implementation provides a specific manner of obtaining the storage duration. This improves operability of the solution.

In one example design, in a tenth implementation of the second aspect of this embodiment, the query policy further includes a range of apps to which the query policy is applicable on the terminal. The query policy in this implementation further includes the application scope of the query policy. This improves completeness of the solution.

According to a third aspect of this embodiment, a terminal is provided, and the terminal includes: a processor, a memory, and a transceiver. The processor, the memory, and the transceiver are connected by using a bus, the memory stores a computer instruction, and when the processor executes the computer instruction in the memory, the terminal is configured to implement any implementation of the first aspect.

According to another aspect of this application, a computer-readable storage medium is provided. The computer-readable storage medium stores an instruction. When the instruction is run on a computer, the computer is enabled to perform the methods according to the foregoing aspects.

According to another aspect of this application, a computer program product including an instruction is provided, and when the computer program product runs on a computer, the computer is enabled to perform the method according to the foregoing aspects.

DESCRIPTION OF EMBODIMENTS

Various embodiments provide an information query method for a terminal and a terminal, so that unnecessary bandwidth traffic of a user and a processing load of a service system can be reduced when service information on a terminal app is queried.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

A query policy is set on the terminal in this embodiment. The query policy may be configured by an administrator by using a policy configuration module in a service system, or may be configured by using another server. A device that configures the query policy is not limited herein. After configuring the query policy, the device sends the configured query policy to the terminal. In this embodiment, the solution in this application is described by using an example in which an administrator configures a query policy by using a policy configuration module in a service system.

Figure 1A:
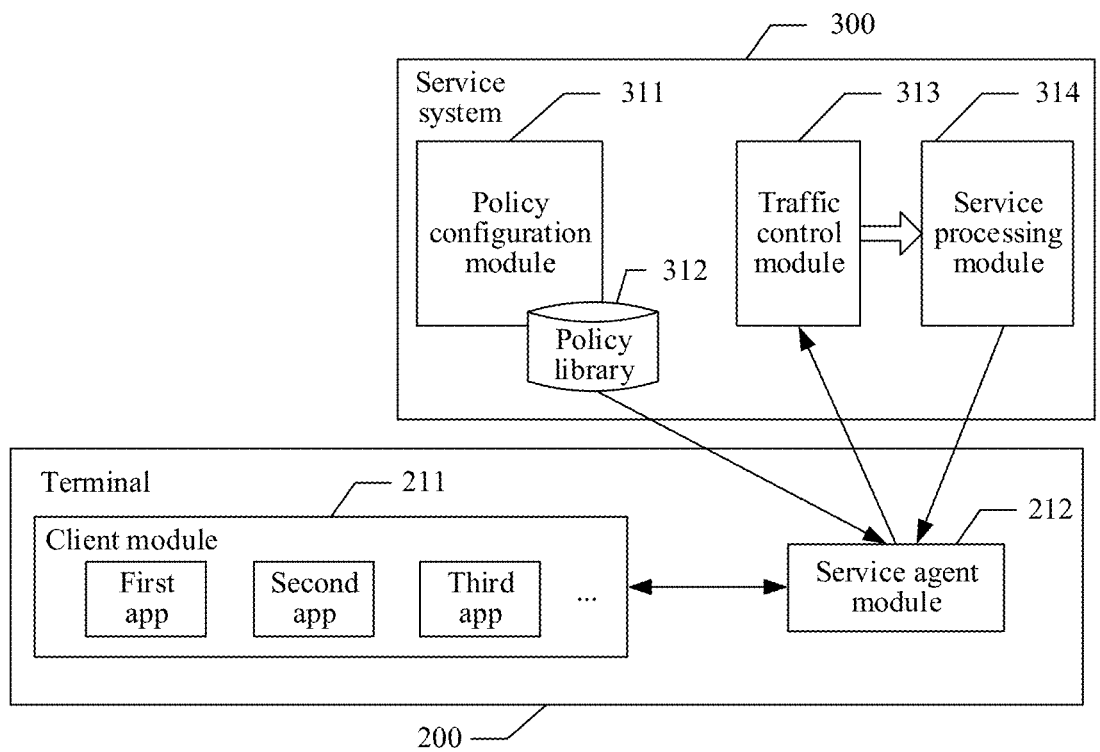
FIG. 1a is a schematic diagram of an application scenario according to an embodiment.

As shown in FIG. 1a, FIG. 1a is a schematic diagram of an application scenario according to an embodiment. The schematic diagram of the application scenario includes a terminal 200 and a service system 300. The terminal 200 includes a client module 211 and a service agent module 212. The service system 300 includes a policy configuration module 311, a policy library 312, a traffic control module 313, and a service processing module 314. The administrator sets the query policy in the policy configuration module 311 in the service system 300, stores the set query policy in the policy library 312, and then sends the query policy to the service agent module 212 on a terminal 200 side.

The traffic control module 313 is configured to perform unified traffic control on a query request sent by the service agent module 212 on the terminal 200 side, and perform traffic control on query requests of service information of a plurality of apps on one terminal by using one terminal as a unit.

The service processing module 314 is configured to process the received query request, and return corresponding service information to the service agent module 212 according to the query request.

A plurality of types of apps are set in the client module 211. A query request sent by a user by using an app in the client module 211 is first sent to the service agent module 212, and then the service agent module 212 determines, according to a preset query policy, whether to send the query request to the service system 300 on a cloud side.

It should be noted that before receiving the query request, the terminal 200 receives a query policy sent by the service system 300. The query policy includes: determining whether the query request received by the terminal 200 meets a first condition, if the query request meets the first condition, requesting the service system 300 to process the query request, and if the first condition does not meet the first condition, determining, based on storage duration of the target service information on the terminal 200, to process the query request on the terminal 200 or request the service system to process the query request. The first condition includes: there is no target service information stored on the terminal 200 and/or a service type of the target service information is a first service type. The target service information corresponds to the query request, and the first service type needs to be requested from the service system.

Figure 1B:
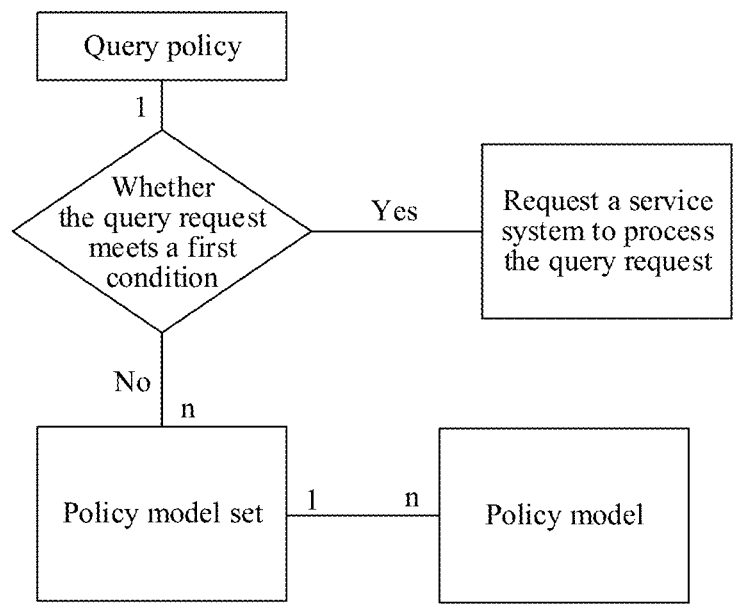
FIG. 1b is a schematic diagram of an interface model definition of a query policy according to an embodiment.

An interface model definition of the query policy in accordance with the present disclosure is shown in FIG. 1B. The query policy stores a plurality of types of policy model sets, and the policy model sets correspond to service types (each service type corresponds to one type of policy model set, and the policy model set includes a plurality of types of query models). Each type of policy model in the policy model set corresponds to one type of app. In FIG. 1b, "1" means "one", and "n" means "a plurality of". The policy model includes:

1. If the storage duration is greater than first preset duration and less than second preset duration, query the terminal for the target service information.

2. If the storage duration is greater than the second preset duration, request the service system to process the query request.

3. If the storage duration is less than the second preset duration, return request failure information to a first app, where the first app corresponds to the query request.

It should be noted that the policy model set in this embodiment is stored in a storage area corresponding to the service type corresponding to the policy model set.

It should be noted that the query policy in this embodiment further includes a range of apps to which the query policy belongs is applicable on the terminal.

It should be noted that, when the query policy in the service system 300 is updated, an updated query policy is synchronously updated to the service agent module 212 on the terminal 200. After the query policy in the service agent module 212 is updated, the service agent module 212 returns, to the service system 300, information indicating that the query policy is updated successfully.

Figure 2:
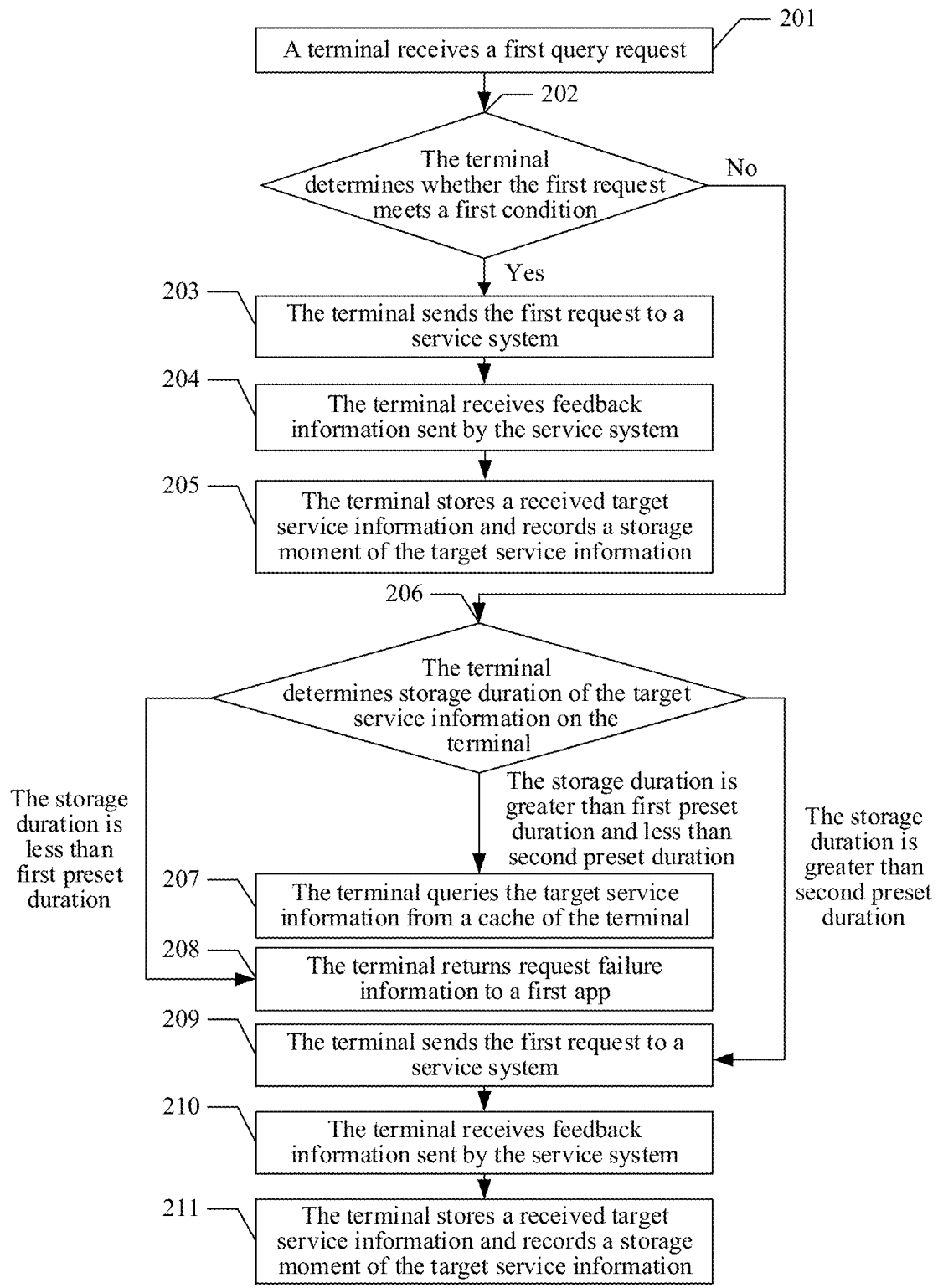
FIG. 2 is a schematic diagram of an embodiment of an information query method for a terminal according to an embodiment.

Referring to FIG. 2, an embodiment of an information query method for a terminal in this embodiment includes the following steps.

201: A terminal receives a first request.

In this embodiment, when a user wants to query target service information of a first app installed on the terminal, the user opens the first app on the terminal, and queries the target service information of the first app by using the first app. The target service information belongs to basic service information. The basic service information includes: a virtual currency, user bonus points, a user avatar, and the like. As shown in FIG. 1a, the first app in the client module on the terminal receives a first request of the user, and then sends the first request to a service agent module on the terminal, so that the service agent module processes the first request.

Figure 3A:
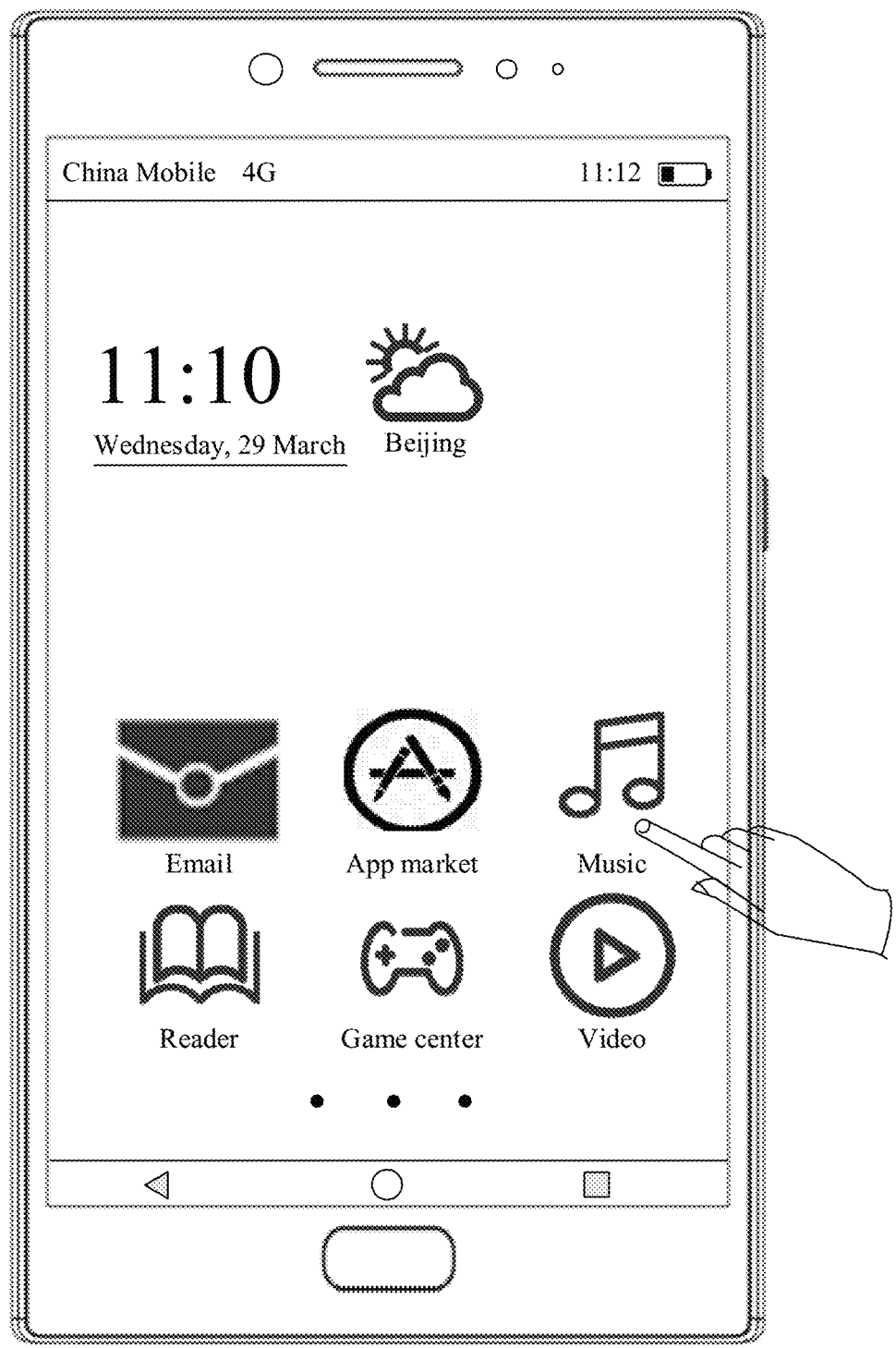
FIG. 3a is a schematic diagram of a scenario of an information query method for a terminal according to an embodiment.
Figure 3B:
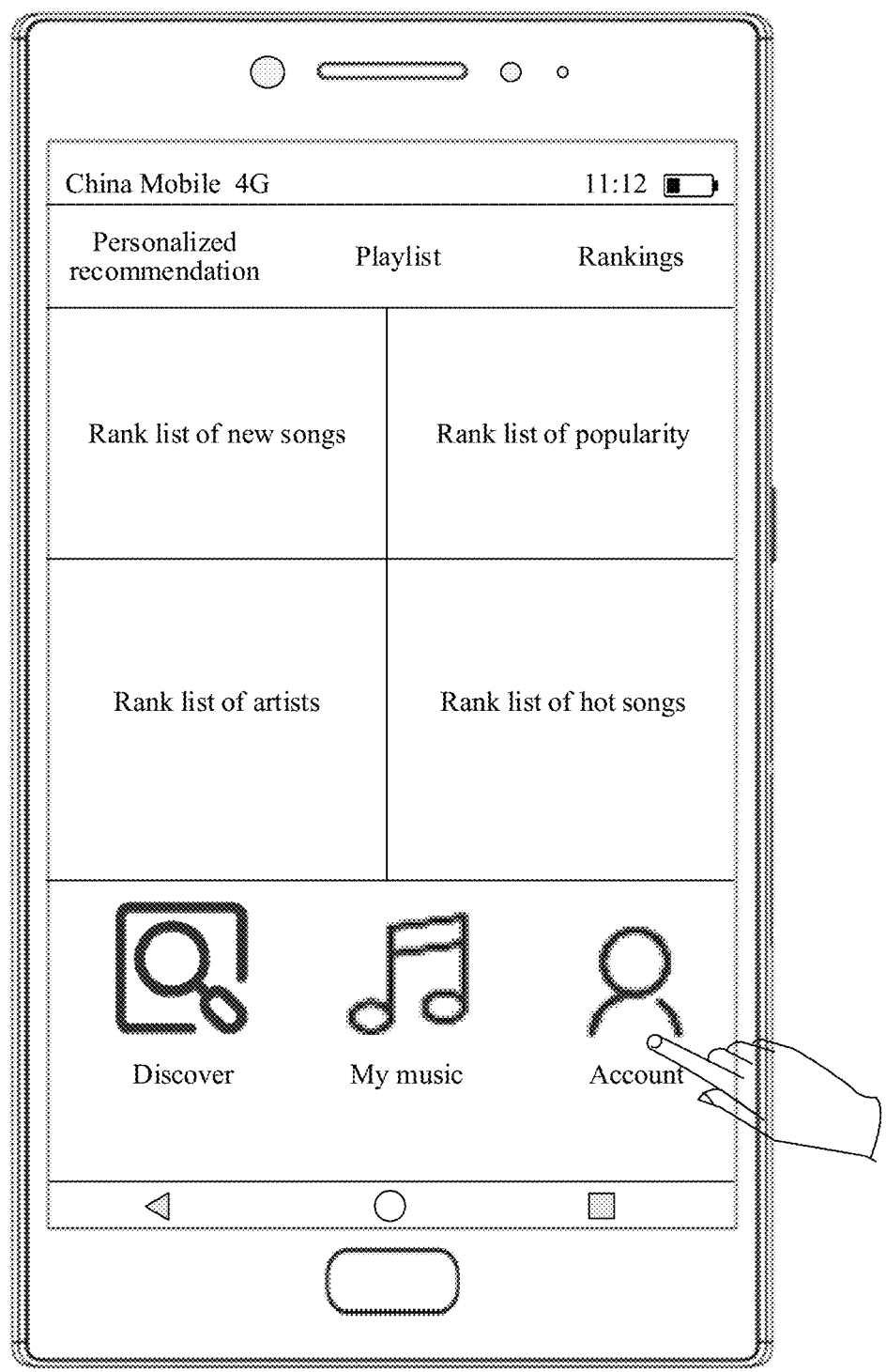
FIG. 3b is a schematic diagram of another scenario of an information query method for a terminal according to an embodiment.
Figure 3C:
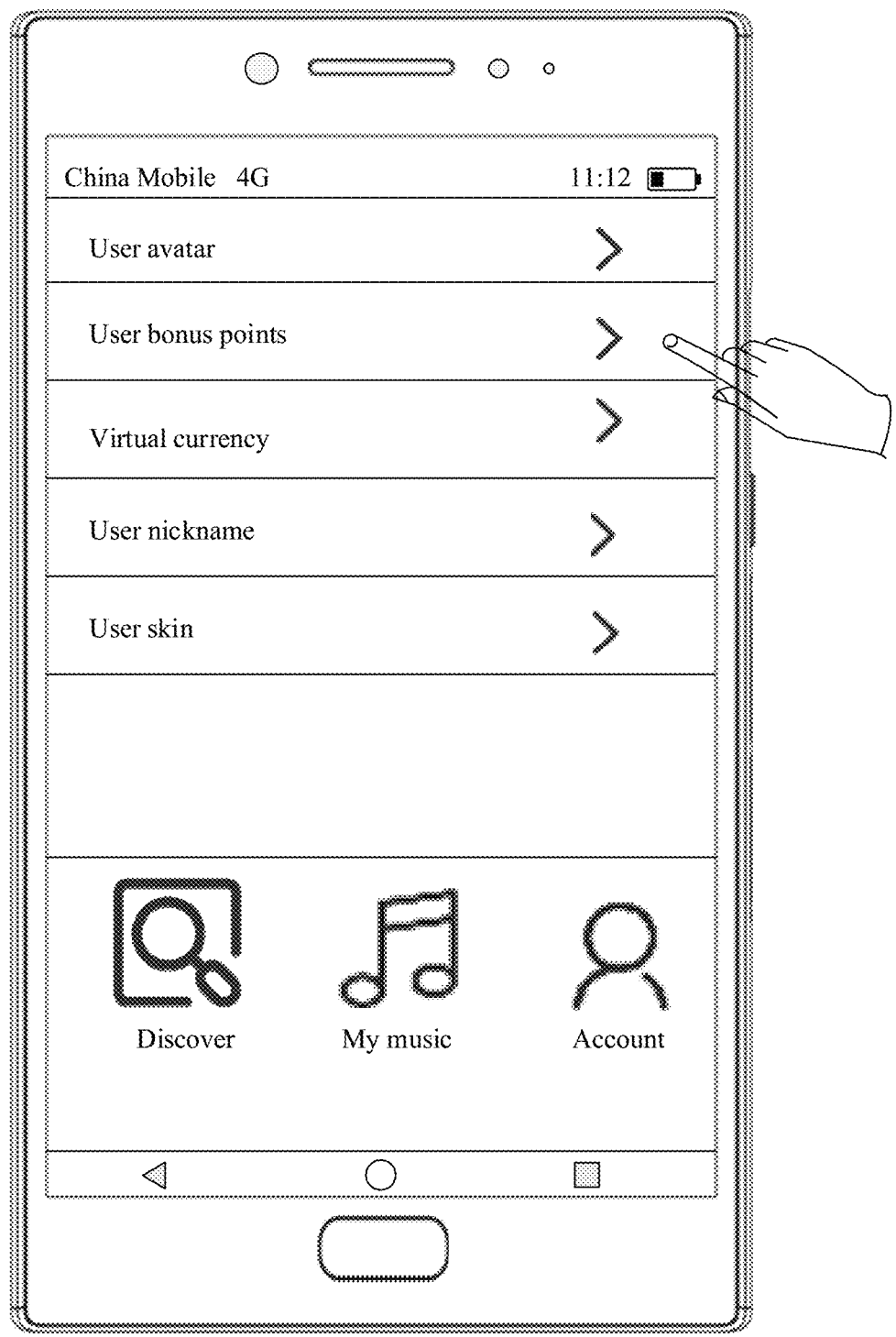
FIG. 3c is a schematic diagram of another scenario of an information query method for a terminal according to an embodiment.

For example, when the first app is a music app, and the target service information is user bonus point information, an example operation is shown in FIG. 3a. FIG. 3a is a schematic diagram in which the user performs an open operation on the music app. In response to the user operation of opening the music app, the terminal displays a screen shown in FIG. 3b. FIG. 3b is a schematic diagram in which a terminal displays screen content of a music app and performs an "account" opening operation. After correspondingly opening the "account", the terminal displays a screen shown in FIG. 3c, and then the user taps the "user bonus point" in FIG. 3c. In this case, the terminal receives the first request triggered by the user.

202: The terminal determines whether the first request meets a first condition. If the first request meets the first condition, steps 203 to 205 are performed. If the first request meets the first condition, step 206 is performed.

In this embodiment, after the terminal receives the first request, the service agent module on the terminal first determines whether the first request meets the first condition, in other words, determines whether there is target service information that corresponds to the first request and that is already stored on the terminal and/or whether a target service type is a first service type. The first service type needs to be requested from a service system, for example, a heartbeat request.

It should be noted that in this embodiment, there is no sequence between two determining actions of determining, by the service agent module, whether there is the target service information that corresponds to the first request and that is stored on the terminal, and determining whether the target service type is the first service type. The service agent module may determine, as long as the service agent module determines that the first request meets one of the conditions, that the first request meets the first condition.

203: The terminal sends the first request to the service system.

In this embodiment, when the terminal determines that the first request meets the first condition, in other words, when there is no target service information stored on the terminal and/or the target service type is the first service type, the terminal sends the first request to the service system, so that the service system processes the first request.

204: The terminal receives feedback information sent by the service system.

In this embodiment, after the service agent module on the terminal sends the first request to a service system side, the service system sends the feedback information based on the first request. The feedback information includes the target service information or the system busy information.

Figure 4A:
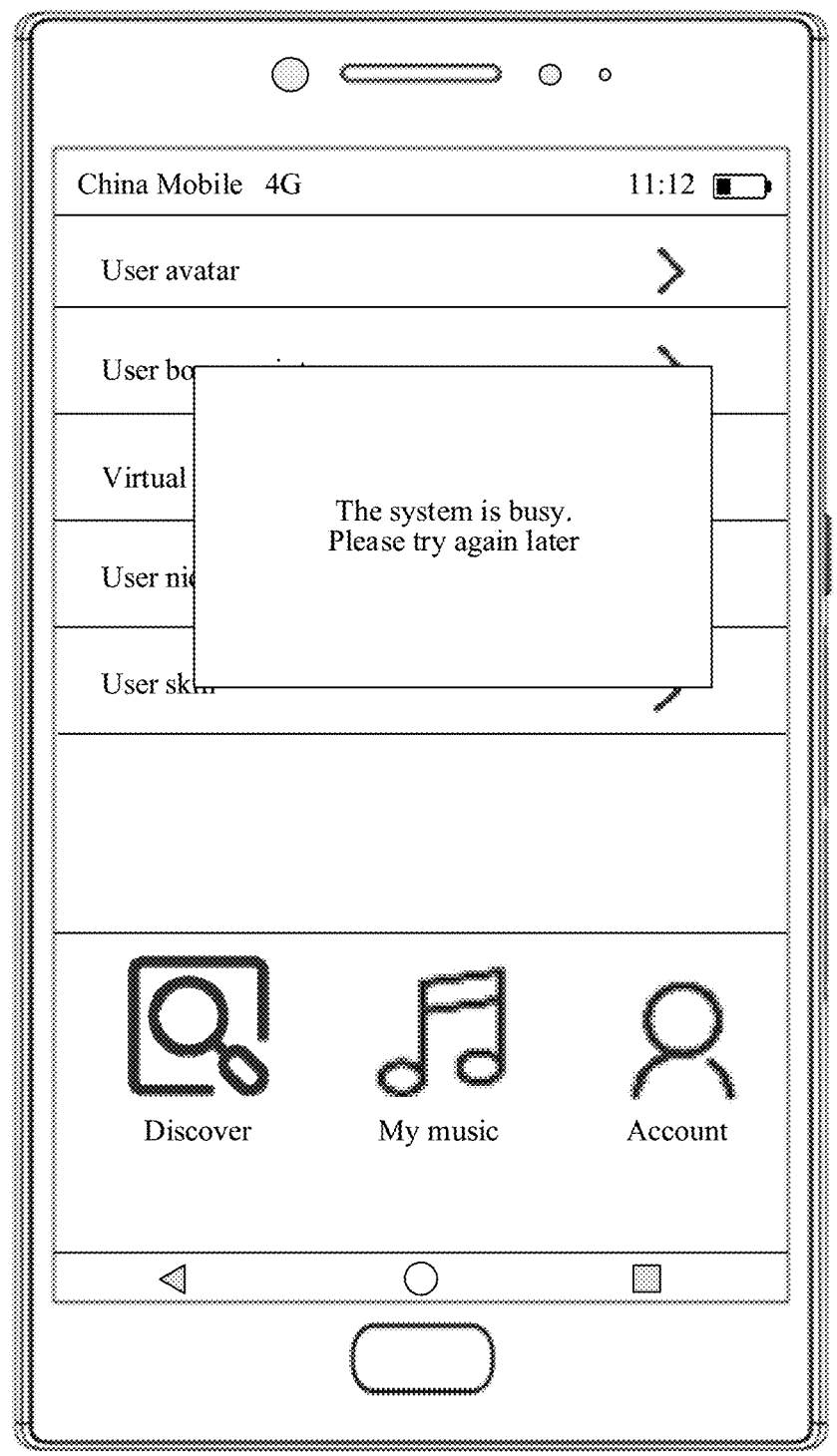
FIG. 4a is a schematic diagram of another scenario of an information query method for a terminal according to an embodiment.

For instance, after the service system receives the first request, the service system determines a processing capability of the system in this case by using the traffic control module in FIG. 1*a*. If the first request exceeds the processing capability of the service system, the traffic control module discards the first request, and returns a response indicating that the system is busy to the service agent module on the terminal, and the service agent module returns an interface indicating that the system is busy to the first app that initiates the request. In this case, a terminal screen may be shown in FIG. 4*a*, and the terminal displays "The system is busy. Please try again later" on the screen. If the service system has the processing capability, the traffic control module sends the first request to the service processing module, and the service processing module returns the target service information to the service agent module on the terminal based on the received first request. An example processing process after the service system receives the first request is the prior art. Details are not described herein.

205: The terminal stores the received target service information and records a storage moment of the target service information.

Figure 4B:
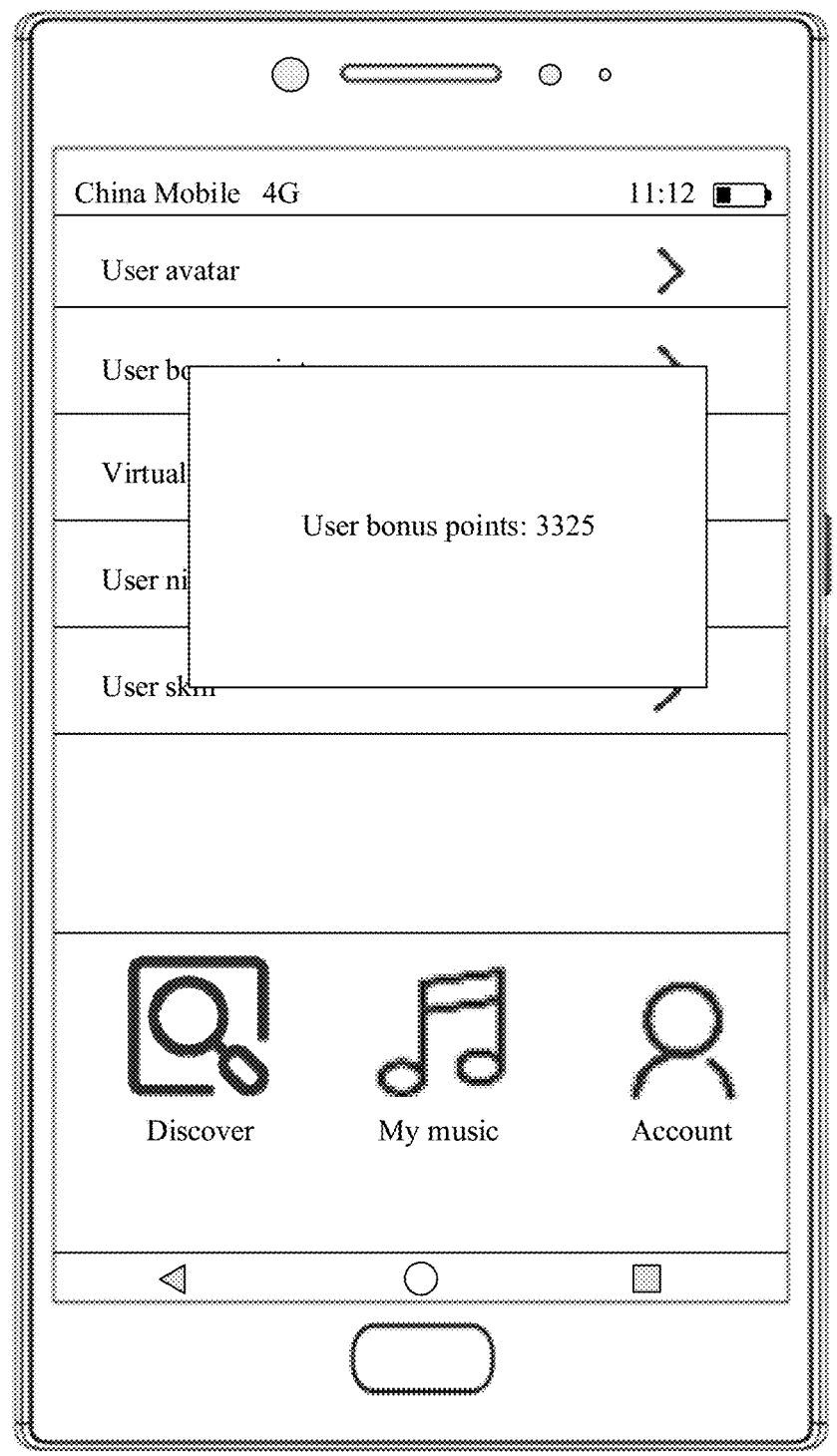
FIG. 4b is a schematic diagram of another scenario of an information query method for a terminal according to an embodiment.

In this embodiment, when the feedback information received by the service agent module on the terminal is the target service information, the service agent module stores the target service information and records the storage moment of the target service information, and then the service agent module returns the target service information to the first app that initiates the request. In this case, the terminal screen may be shown in FIG. 4*b*, and the terminal displays specific user bonus point information "user bonus points: 3325 bonus points" on the screen.

It should be noted that when the feedback information received by the service agent module on the terminal is system busy information, no separate step is shown in FIG. 2, but a person skilled in the art may understand.

206: The terminal determines storage duration of the target service information on the terminal. If the storage duration is greater than first preset duration and less than second preset duration, step 207 is performed. If the storage duration is less than first preset duration, step 208 is performed. If the storage duration is greater than second preset duration, steps 209 to 211 are performed.

In this embodiment, when it is determined that there is the target service information stored on the terminal, and the service type corresponding to the first request is not the first service type, the terminal needs to determine the storage duration of the target service information stored on the terminal.

That the terminal determines the storage duration of the target service information on the terminal includes: the terminal determines a time interval between the storage moment of the target service information and a query moment. The storage moment is a moment at which the terminal receives the first request.

When the first app is the music app, and the target service information is the user bonus point information, after receiving the first request, the service agent module on the terminal determines whether the first request meets the first condition. If it is learned, from the determining, that the first request does not meet the first condition, the service agent module finds, based on the service type corresponding to the first request, a policy model set corresponding to the service type, and then finds, in the policy model set based on an app type (the music app) of the first app, a policy model corresponding to the first app. The policy model is:

1. If storage duration of the user bonus point information is greater than 2 seconds and less than 30 seconds, query the target service information from the terminal.

2. If the storage duration of the user bonus point information is greater than 30 seconds, request the service system to process the first request.

3. If the storage duration of the user bonus point information is less than 2 seconds, return request failure information to the music app.

In this case, if the service agent module finds that a buffer moment of locally buffering, by the terminal, the user bonus point information is 12:12:30, and the query moment of the first request is 12:12:40, the difference between the buffer moment of the user bonus point information and the query moment is 10 seconds, and 10 seconds are greater than 2 seconds and less than 30 seconds. In this case, it can be learned from the policy model that there is the user bonus point information whose storage duration is greater than 2 seconds and less than 30 seconds and that is stored on the terminal. In this case, the target service information is queried from the terminal.

In this case, if the service agent module finds that the buffer moment of locally buffering, by the terminal, the user bonus point information is 12:12:39, and the query moment of the first request is 12:12:40, the difference between the buffer moment of the user bonus point information and the query moment is 1 second, and 1 second is less than 2 seconds. In this case, it can be learned from the policy model that there is the user bonus point information whose storage duration is less than 2 seconds and that is stored on the terminal. In this case, the terminal returns the request failure message to the music app.

In this case, if the service agent module finds that the buffer moment of locally buffering, by the terminal, the user bonus point information is 12:11:40, and the query moment of the first request is 12:12:30, the difference between the buffer moment of the user bonus point information and the query moment is 50 seconds, and 50 seconds are greater than 30 seconds. In this case, it can be learned from the policy model that there is the user bonus point information whose storage duration is greater than 30 seconds and that is stored on the terminal. In this case, the terminal requests the service system to process the first request.

Time lengths of the first preset duration and the second preset duration correspond to the service type corresponding to the first request (the service type of the target service information) and apps corresponding to the first request, in other words, different apps with a same service type may have different time lengths of the first preset duration and the second preset duration, and different service types in a same app may also have different time lengths of the first preset duration and the second preset duration. An administrator sets corresponding first preset duration and second preset duration for each service type on each app. Values of the first preset duration and the second preset duration are not specifically limited herein.

Before the terminal receives the first request, the terminal further receives a second request, where the second request indicates to query the target service information of the second app on the terminal, the terminal obtains the target service information from the service system based on the second request, and the terminal stores the target service information and records a storage moment of the target service information. To save storage resources, the target service information is automatically deleted after being stored for a specific time length (for example, 40 seconds), and the storage moment at which the target service information is stored is deleted. The second app may be the same as the first app, or may be different from the first app.

In this embodiment, after the terminal receives the first request triggered by the user, the terminal does not directly send the first request to the service system on a cloud side. The first request is first processed by the service agent module on the terminal in FIG. 1a. A query policy is preset in the service agent module. After receiving the first request, the service agent module determines whether the first request meets the first condition. If the first request meets the first condition, the service agent module sends the first request to the service system. If the first request does not meet the first condition, the service agent module invokes a corresponding policy model based on the service type corresponding to the first request and the apps corresponding to the first request, and then queries the target service information based on the policy model.

207: The terminal queries the target service information from a cache of the terminal.

In this embodiment, when there is the target service information whose storage duration is greater than the first preset duration and less than the second preset duration and that is stored on the terminal, the terminal extracts the target service information from the cache of the terminal and sends the target service information to the first app. In this case, the terminal screen may be shown in FIG. 4b, and in response to the first request, the terminal displays specific user bonus point information "user bonus points: 3325" on the screen.

When the terminal extracts the target service information from the cache of the terminal, and the terminal does not record the storage moment of the target service information again. Only when the terminal obtains the service information from the service system side, the terminal stores the service information and records the storage moment at which the service information is stored.

After receiving the first request, the terminal does not directly forward the query request to the service system, and determines, based on the query policy in the service agent module, whether to forward the received query request to the service system. In this embodiment, when it is learned, from the query policy, that there is the target service information whose storage duration is greater than the first preset duration and less than the second preset duration and that is stored on the terminal, the terminal directly extracts the target service information from the cache of the terminal.

208: The terminal returns the request failure information to the first app.

Figure 4C:
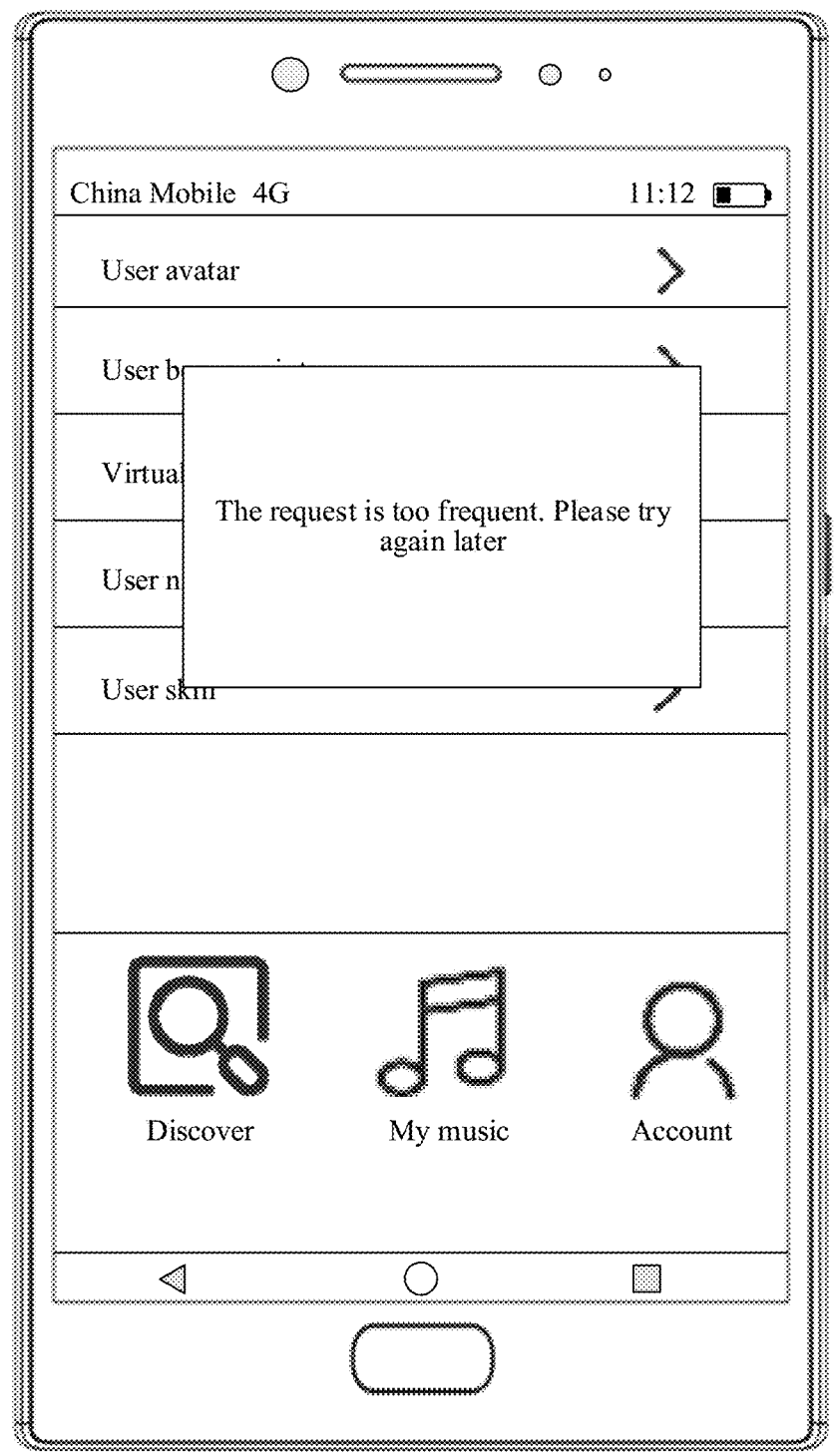
FIG. 4c is a schematic diagram of another scenario of an information query method for a terminal according to an embodiment.

In this embodiment, when the terminal learns, from the step 206, that there is the target service information whose storage duration is less than the first preset duration and that is stored on the terminal (in other words, another app or the first app on the terminal has requested, within the first preset duration, the service information the same as the first request), the terminal returns the request failure information to the first app. In this case, the terminal screen may be shown in FIG. 4c, and the terminal displays specific information indicating that the request fails on the screen: "The request is too frequent. Please try again later."

209: The terminal sends the first request to the service system.

In this embodiment, when the terminal learns, from the step 206, that the storage duration of the target service information on the terminal is greater than the second preset duration (in other words, the apps on the terminal does not send, within the second preset duration, the query request for requesting the target service information), the service agent module sends the first request to the service system.

After the service system receives the first request, the service system determines a processing capability of the system in this case by using the traffic control module in FIG. 1a. If the first request exceeds the processing capability of the service system, the traffic control module discards the first request, and returns a response indicating that the system is busy to the service agent module on the terminal, and the service agent module returns an interface indicating that the system is busy to the first app that initiates the request. In this case, a terminal screen may be shown in FIG. 4a, and the terminal displays "The system is busy. Please try again later" on the screen. If the service system has the processing capability, the traffic control module sends the first request to the service processing module, and the service processing module returns the target service information to the service agent module on the terminal based on the received first request. A specific processing process after the service system receives the first request is the prior art. Details are not described herein.

210: The terminal receives feedback information sent by the service system.

211: The terminal stores the received target service information and records a storage moment of the target service information.

In this embodiment, step 210 to step 211 are similar to step 204 to step 205. Details are not described herein again.

In this embodiment, the query policy may be updated. Therefore, a specific query policy is not limited herein.

Because the target service information is automatically deleted after being stored for a specific time length, and the storage moment of the target service information on the terminal is also deleted at the same time. In this case, when receiving the first request for querying the target service information, the service agent module cannot query the target service information stored on the terminal, and the terminal forwards the request to the service system.

In this embodiment, the terminal receives the first request. The first request is used to indicate to query the target service information of the first app on the terminal; and determine, according to the query policy preset on the terminal, to process the first request on the terminal or request the service system associated with the terminal to process the first request. In this embodiment, the target service information is queried based on the preset query policy, and some query requests may be filtered out. The filtered query requests do not need to be sent to the service system. Therefore, when the service information in the terminal app is queried, unnecessary bandwidth traffic of the user can be effectively reduced, and a processing load of the service system can be reduced.

In addition, in this embodiment, a malicious program of an app on the terminal may be prevented from sending a large quantity of query requests to the service system. This greatly reduces a processing load of the service system. In addition, from a perspective of the user, a same type of service information between a plurality of apps is the same, and the service system controls and queries service information by using the user terminal as a unit, instead of by using an app as a unit. User services are balanced, a plurality of apps on the user terminal are prevented from requesting the same service information from the service system in a short time, and unnecessary bandwidth traffic of the user can be reduced. In addition, the query result of the app on the terminal can be quickly returned through the local cache. This can effectively improve user experience.

Figure 5:
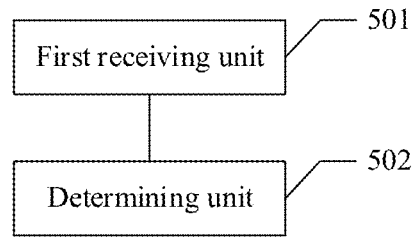
FIG. 5 is a schematic structural diagram of a terminal according to an embodiment.

The foregoing describes the information query method for the terminal in this embodiment. The following describes the terminal in the embodiments of this application. Referring to FIG. 5, an embodiment of the terminal in the embodiments of this application includes:

a first receiving unit 501, configured to receive a first request, where the first request is used to indicate to query target service information of a first application app on the terminal; and a determining unit 502, configured to determine, according to a query policy preset on the terminal, to process the first request on the terminal or request a service system associated with the terminal to process the first request.

Figure 6:
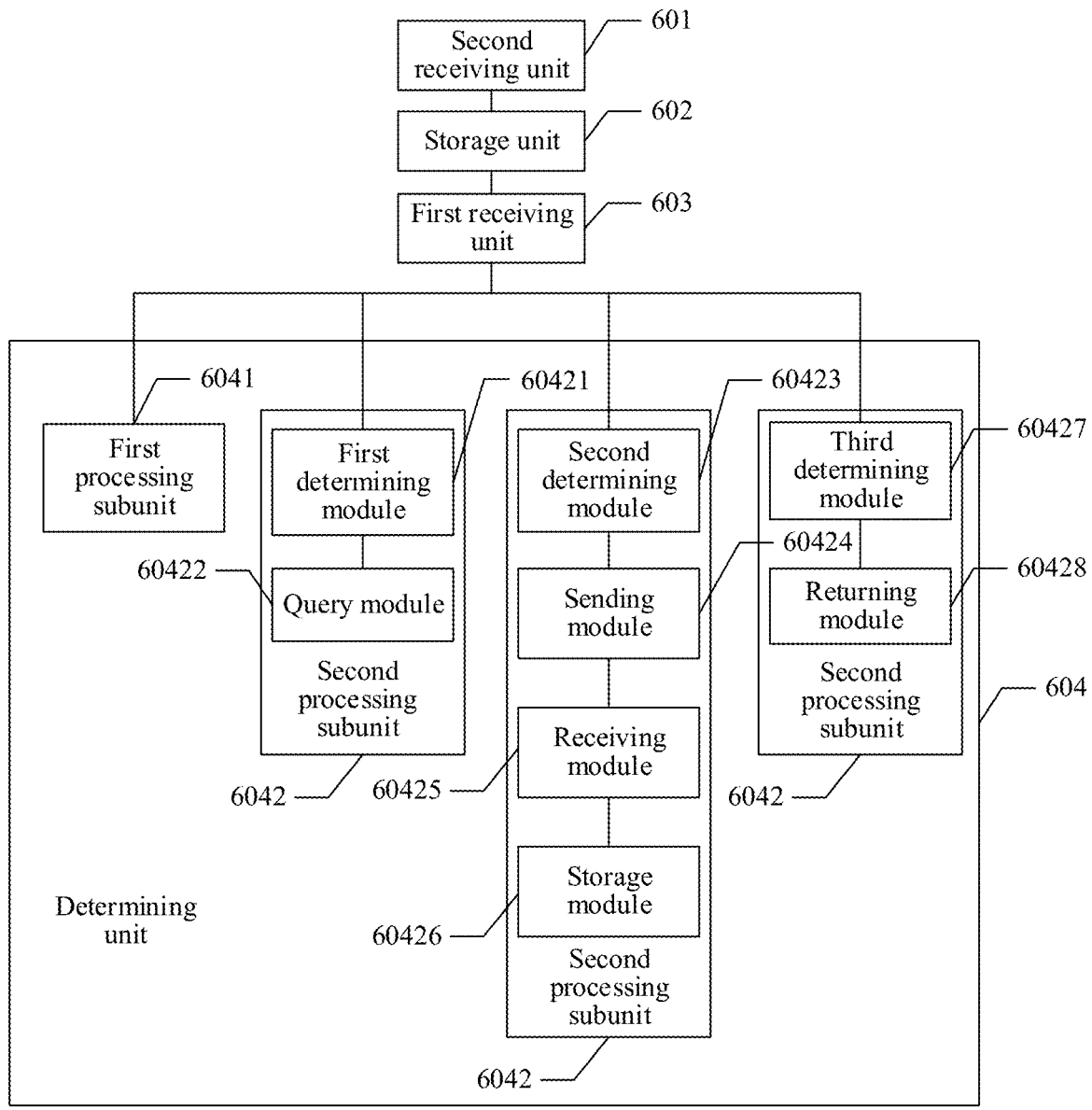
FIG. 6 is another schematic structural diagram of a terminal according to an embodiment.

Referring to FIG. 6, another embodiment of the terminal in the embodiments of this application includes:

a second receiving unit 601, configured to receive target service information based on a second request, where the second request indicates to query the target service information of a second app on the terminal;

a storage unit 602, configured to store the target service information and record a storage moment of the target service information;

a first receiving unit 603, configured to receive a first request, where the first request is used to indicate to query target service information of a first application app on the terminal; and a determining unit 604, configured to determine, according to a query policy preset on the terminal, to process the first request on the terminal or request a service system associated with the terminal to process the first request.

The determining unit 604 includes:

a first processing subunit 6041, configured to, when the first request meets a first condition, request the service system to process the first request, where the first condition includes: there is no target service information stored on the terminal and/or a service type of the target service information is a first service type; and a second processing subunit 6042, configured to, when the first request does not meet the first condition, determine, based on storage duration of the target service information on the terminal, to process the first request on the terminal or request the service system to process the first request.

The second processing subunit 6042 includes:

a first determining module 60421, configured to determine whether the storage duration is greater than first preset duration and less than second preset duration, where the first preset duration and the second preset duration separately correspond to the target service information of the first app; and a query module 60422, configured to, when the storage duration is greater than the first preset duration and less than the second preset duration, query the terminal for the target service information.

The first determining module 60421 is specifically configured to:

determine whether a time interval between the storage moment and a query moment is greater than the first preset duration and less than the second preset duration, where the query moment is a moment at which the first request is received.

Alternatively, the second processing subunit 6042 includes:

a second determining module 60423, configured to determine whether the storage duration is greater than second preset duration, where the second preset duration corresponds to the target service information of the first app;

a sending module 60424, configured to, when the storage duration is greater than the second preset duration, send the first request to the service system;

a receiving module 60425, configured to receive the target service information sent by the service system; and a storage module 60426, configured to store the target service information and record the storage moment of the target service information.

The second determining module 60423 is specifically configured to:

determine whether a time interval between the storage moment and a query moment is greater than the second preset duration, where the query moment is a moment at which the first request is received.

Alternatively, the second processing subunit 6042 includes:

a third determining module 60427, configured to determine whether the storage duration is less than first preset duration, where the first preset duration corresponds to the target service information of the first app; and a returning module 60428, configured to return request failure information to the first app when the storage duration is less than the first preset duration.

The third determining module 60427 is specifically configured to:

determine whether a time interval between the storage moment and a query moment is less than the first preset duration, where the query moment is a moment at which the first request is received.

Figure 7:
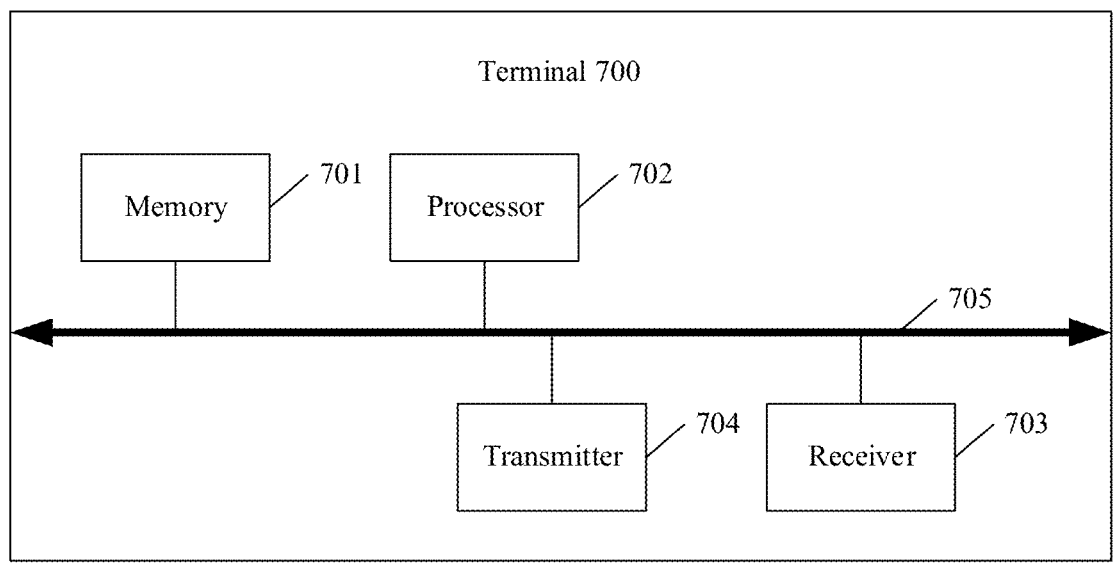
FIG. 7 is another schematic structural diagram of a terminal according to an embodiment.

Referring to FIG. 7, an embodiment further provides a terminal 700, including one or more processors 702, a receiver 703, a transmitter 704, a memory 701, and a bus 705. The one or more processors 702, the receiver 703, the transmitter 704, and the memory 701 are connected to each other by using the bus 705.

The one or more processors 702 are configured to: run at least one application program in a background, and delete at least one target application program based on user data. The user data is statistical data obtained based on a historical record of an application used by a user. The target application program meets a preset rule, which is determined based on the user data.

All related content of the steps in the foregoing method embodiments may be cited in function descriptions of corresponding functional modules. Details are not described herein.

The memory 701 stores one or more programs. The memory 701 may mainly include a program storage area and a data storage area. The program storage area may store an operating system, an application (Application, APP) program required by at least one function, and the like. The data storage area may store data created based on use of the terminal 700, and the like. In addition, the memory 701 may include a high-speed random access memory, and may further include a non-volatile memory, such as at least one magnetic disk storage device, a flash memory device, or another volatile solid-state storage device.

The one or more processors 702 may be a central processing unit (Central Processing Unit, CPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor.

The receiver 703 and the transmitter 704 are configured to enable the terminal 700 to communicate with another device.

The bus 705 may be a peripheral component interconnect (Peripheral Component Interconnect, PCI) bus, an extended industry standard architecture (Extended Industry Standard Architecture, EISA) bus, and or the like. The bus may be classified into an address bus, a data bus, a control bus, and the like. For ease of representation, only one thick line is used to represent the bus in FIG. 7, but this does not mean that there is only one bus or only one type of bus.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several indications for indicating a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An information query method for a terminal, the method comprising:
   receiving, by the terminal, a first request indicating to query target service information of a first application (app), wherein the first request is received based on a user input operation made in association with the first app stored in a memory of the terminal; and
   determining, by the terminal, and according to a query policy associated with storage duration of the target service information of the first app stored in the memory of the terminal, whether to process the first request on the terminal or request a service system associated with the terminal to process the first request, wherein
   determining whether to process the first request on the terminal or request the service system to process the first request includes:
      when the storage duration of the target service information is greater than a first present duration and less than a second preset duration, processing the first request on the terminal by querying the target service information from a cache of the terminal, wherein the first preset duration and the second preset duration separately correspond to the target service information of the first app; and
      when the storage duration of the target service information is greater than the second preset duration, sending, by the terminal, the first request to the service system and receiving feedback information sent by the service system.

2. The method according to claim 1, wherein before receiving the first request, the method further comprises:
   receiving the target service information based on a second request indicating to query the target service information of a second app on the terminal; and
   storing the target service information and recording a storage moment of the target service information.

3. The method according to claim 1, wherein determining, according to the query policy of the terminal, to process the first request on the terminal or request the service system associated with the terminal to process the first request comprises:
   when the first request meets a first condition, requesting the service system to process the first request, wherein the first condition includes at least one of: no target service information is stored on the terminal or a service type of the target service information is a first service type; and
   when the first request does not meet the first condition, determining, based on the storage duration of the target service information on the terminal, to process the first request on the terminal or request the service system to process the first request.

4. The method according to claim 3, wherein determining whether the storage duration is greater than the first preset duration and less than the second preset duration comprises:
   determining whether a time interval between the storage moment and a query moment is greater than the first preset duration and less than the second preset duration, wherein the query moment is a moment at which the first request is received.

5. The method according to claim 3, wherein determining whether the storage duration is greater than the second preset duration comprises:
   determining whether a time interval between the storage moment and a query moment is greater than the second preset duration, wherein the query moment is a moment at which the first request is received.

6. The method according to claim 3, wherein after receiving the target service information sent by the service system, the method further comprises:
   storing the target service information and recording the storage moment of the target service information.

7. The method according to claim 3, wherein determining, based on the storage duration of the target service information on the terminal, to process the first request on the terminal or request the service system to process the first request comprises:
   determining whether the storage duration is less than the first preset duration, wherein the first preset duration corresponds to the target service information of the first app; and
   if the storage duration is less than the first preset duration, returning request failure information to the first app, wherein
   determining whether the storage duration is less than the first preset duration includes determining whether a time interval between the storage moment and a query moment is less than the first preset duration, wherein the query moment is a moment at which the first request is received.

8. The method according to claim 1, wherein the first request is filtered from requesting the service system to process the first request based on the query policy thereby reducing unnecessary bandwidth traffic.

9. The method according to claim 1, wherein the target service information includes basic service information of the first app, wherein the basic service information includes information supplemental to use of the first app.

10. The method according to claim 1, wherein the query policy is associated with a plurality of applications stored in the memory of the terminal.

11. The method of claim 1, wherein the feedback information indicates a processing capability of the service system, and the terminal is configured to display, on a user interface, information associated with the processing capability of the service system.

12. A terminal, comprising:
   a processor;
   a transceiver; and
   a memory configured to store computer readable instructions that, when executed by the processor, cause the terminal to:
   receive, based on a user input operation made in association with a first application (app) stored in the memory of the terminal, a first request indicating to query target service information of the first application (app); and
   determine, according to a query policy associated with storage duration of the target service information of the first app stored in the memory of the terminal, whether to process the first request on the terminal or request a service system associated with the terminal to process the first request, wherein determining whether to process the first request on the terminal or request the service system to process the first request includes:
when the storage duration of the target service information is greater than a first present duration and less than a second preset duration, processing the first request on the terminal by querying the target service information from a cache of the terminal, wherein the first preset duration and the second preset duration separately correspond to the target service information of the first app; and
when the storage duration of the target service information is greater than the second preset duration, sending, by the terminal, the first request to the service system and receiving feedback information sent by the service system.

13. The terminal according to claim 12, wherein the terminal is further caused to:
when the first request meets a first condition, request the service system to process the first request, wherein the first condition includes at least one of: no target service information is stored on the terminal or a service type of the target service information is a first service type; and
when the first request does not meet the first condition, determine, based on the storage duration of the target service information on the terminal, to process the first request on the terminal or request the service system to process the first request.

14. The terminal according to claim 13, wherein the terminal is further caused to:
determine whether a time interval between the storage moment and a query moment is greater than the first preset duration and less than the second preset duration, wherein the query moment is a moment at which the first request is received.

15. The terminal according to claim 13, wherein the terminal is further caused to:
determine whether a time interval between the storage moment and a query moment is greater than the second preset duration, wherein the query moment is a moment at which the first request is received.

16. The terminal according to claim 13, wherein the terminal is further caused to:
store the target service information and record the storage moment of the target service information.

17. The terminal according to claim 13, wherein the terminal is further caused to:
determine whether the storage duration is less than the first preset duration, wherein the first preset duration corresponds to the target service information of the first app; and if the storage duration is less than the first preset duration, return request failure information to the first app, wherein
determining whether the storage duration is less than the first preset duration includes determining whether a time interval between the storage moment and a query moment is less than the first preset duration, wherein the query moment is a moment at which the first request is received.

18. The terminal according to claim 12, wherein the feedback information indicates a processing capability of the service system, and the terminal is configured to display, on a user interface, information associated with the processing capability of the service system.

19. A non-transitory computer readable storage medium configured to store computer readable instructions that, when executed by a processor of a terminal, cause the terminal to provide execution comprising:
receiving, by the terminal, a first request indicating to query target service information of a first application (app), wherein the first request is received based on a user input operation made in association with the first app stored in a memory of the terminal; and
determining, by the terminal, and according to a query policy associated with storage duration of the target service information of the first app stored in the memory of the terminal, whether to process the first request on the terminal or request a service system associated with the terminal to process the first request, wherein
determining whether to process the first request on the terminal or request the service system to process the first request includes:
when the storage duration of the target service information is greater than a first present duration and less than a second preset duration, processing the first request on the terminal by querying the target service information from a cache of the terminal, wherein the first preset duration and the second preset duration separately correspond to the target service information of the first app; and
when the storage duration of the target service information is greater than the second preset duration, sending, by the terminal, the first request to the service system and receiving feedback information sent by the service system.

20. The non-transitory computer readable storage medium of claim 19, wherein the feedback information indicates a processing capability of the service system, and the terminal is configured to display, on a user interface, information associated with the processing capability of the service system.

* * * * *